United States Patent [19]
Weisz et al.

[11] 3,855,980
[45] Dec. 24, 1974

[54] FUEL SYSTEMS FOR ENGINES

[75] Inventors: Paul B. Weisz, Yardley, Pa.; Nai Yuen Chen, Hopewell Township; Stanley J. Lucki, Runnemede, both of N.J.

[73] Assignee: Mobil Oil Corporation, New York, N.Y.

[22] Filed: Apr. 13, 1970

[21] Appl. No.: 27,563

[52] U.S. Cl. ............ 123/3, 123/119 R, 123/122 E, 208/120
[51] Int. Cl. ............................................ F02b 43/08
[58] Field of Search .... 123/3, 122 E, 119 R, 119 E; 208/120

[56] References Cited
UNITED STATES PATENTS

| | | |
|---|---|---|
| 2,201,965 | 5/1940 | Cook ........................................ 123/3 |
| 3,630,966 | 12/1971 | Chen et al. ...................... 208/120 X |
| 3,635,200 | 1/1972 | Rundell et al. .......................... 123/3 |
| 3,684,738 | 8/1972 | Chen............................... 208/120 X |
| 3,702,886 | 11/1972 | Argauer et al...................... 423/328 |

Primary Examiner—Wendell E. Burns
Attorney, Agent, or Firm—A. L. Gaboriault

[57] ABSTRACT

Fuel-powered engines are operated in combination with a catalytic converter for the conversion of low octane fuel to high octane fuel which is then introduced into the engine to provide light high octane components for burning in the engine. The catalytic converter includes a catalyst chamber containing a crystalline aluminosilicate catalyst having an alpha value of at least five and preferably of the ZSM-5 or ZSM-8 type of zeolite. On passage through the catalytic converter, low octane fuel is converted to high hydrocarbon gases and introduced into the engine for burning.

18 Claims, 2 Drawing Figures

PATENTED DEC 24 1974

3,855,980

FIG. 2  OCTANE vs. ON-STREAM TIME at 900°F, 100 WHSV.

INVENTORS
PAUL B. WEISZ, NAI Y. CHEN
& STANLEY J. LUCKI
BY O.G. Hayes
ATTORNEY

3,855,980

FUEL SYSTEMS FOR ENGINES

BACKGROUND OF THE INVENTION

1. Field of the Invention

This invention relates to apparatus for and a method of treating fuel to raise its octane number, and in particular relates to the treatment of low octane fuel to improve its efficiency for the generation of power.

2. Background of the Prior Art

In the operation of fuel powered engines, including internal and external combustion engines, turbine engines, combinations thereof, and the like, a continuing problem has been the provision of a suitable motive fuel suitable to power the high compression engines employed. Such fuels are generally relatively expensive as elaborate external processing and the use of additives have been necessary to provide the needed characteristics for optimum detonation, explosion and combustion.

The problem has been most acute to the consumer in the operation of high compression ratio automotive engines, as it is well known that it is necessary to use a specially refined high octane number gasoline for their operation. Generally, such gasolines contain lead additives in order to obtain high engine performance. In the use of these leaded high-octane gasolines now employed in the operation of automotive internal combustion engines for example, it is well known that serious problems with respect to pollution of the atmosphere are present because of the hydrocarbon and carbon monoxide pollution problems from auto exhausts. In particular in view of the tremendous number of automobiles now being operated, the pollution problem is becoming extremely important. Moreover, the costs involved in purchasing high-octane gasolines are increasing.

There are many procedures which have been proposed for the elimination of the pollution problem including the passage of laws which require that automotive manufacturers equip automobiles with devices which will prevent the release into the atmosphere of the various noxious gases produced by an internal combustion engine. Aircraft engines have been subjected to the same criticisms. The thrust of the solutions proposed heretofore has been by way of devices located in the exhaust portion of an automotive engine in order to filter or decompose the exhaust gases. To the present time however, while several of these devices are in use, none appear particularly successful in achieving a solution to the pollution problem.

In this invention it is proposed to provide means whereby a low octane, or regular grade of motive fluid such as gasoline is converted in the combustion system to upgrade or crack the low octane motive fluids to the point where only light hydrocarbon gases are introduced for generation of power in the engine. This has the advantage that substantially complete combustion of the fuel introduced is achieved in operation of the engine, and therefore there are only minor quantities, if any, noxious gases left to be emitted from the exhausts of the engines. The present invention therefore substantially meets the pollution problem well recognized in the operation of such engines and also provides a means of operating high compression engines with lower grade fuel.

It is known in the art to utilize catalytic converters in conjunction with turbine-type engines as well as internal combustion engines. For example, U.S. Pats. No. 2,624,172, 2,632,296 and 2,552,555 to E. J. Houdry disclose combinations of turbine engines with catalyst chambers which are effective to convert motive fluids to nitrogen, water and carbon dioxide which is then introduced into the turbine with fresh air. In this combination however, only oxidizing and reducing catalysts are suggested.

These patents, as well as others, also suggest the use of catalytic converters in combination with internal combustion engines; however, none of these prior procedures have been sufficient to provide a catalytic converter system that will effectively improve the octane of fuel for internal combustion engines, that is practical in size, effective on performance and in operating cycle length. It is accordingly clear that a need remains in the art whereby the above disadvantages of the prior art can be overcome.

SUMMARY OF THE INVENTION

It is accordingly, one object of the present invention, to provide a catalytic hydrocarbon converter as an integral part of an engine operated by motive fluid to achieve a long sustained operation.

A further object of the invention is to provide a catalytic converter system in combination with a combustion engine whereby low octane motive fluid may be effectively converted to light hydrocarbon gases of high octane number which provide sufficient volatility, unusually good distribution of fuel in the engine and added octane number of performance.

A still further object of the invention is to provide a combination of an internal combustion engine with a hydrocarbon catalytic converter which is practical in size, provides effective octane number performance and gives good operating cycle length.

A still further object of the invention is to provide a catalytic combustion chamber in combination with an automotive internal combustion engine wherein the catalyst comprises a special aluminosilicate zeolite catalyst.

Other objects and advantages of the present invention will become apparent as the description thereof proceeds.

In satisfaction of the foregoing objects and advantages there is provided by this invention a combination of a combustion engine with means for the introduction of fuel into the engine for burning, this means comprising a fuel tank containing fuel of relatively low octane number, means for passage of the fuel to a hydrocarbon catalytic converter operated at temperatures above about 600°F., and means for passage of the effluent from the hydrocarbon converter into the engine for burning, said catalytic converter containing a crystalline aluminosilicate catalyst having an alpha value of at least five. Also provided by this invention is the catalytic hydrocarbon converter per se and the various means for its combination with the engine to provide a new source of power.

BRIEF REFERENCE TO THE DRAWINGS

Reference is now made to the drawings accompanying the invention wherein there is shown a diagrammatic view of the catalytic converter in combination with a combustion engine in FIG. 1 and in FIG. 2, a graph showing catalyst life during an actual run.

DESCRIPTION OF PREFERRED EMBODIMENTS

Figure 1:
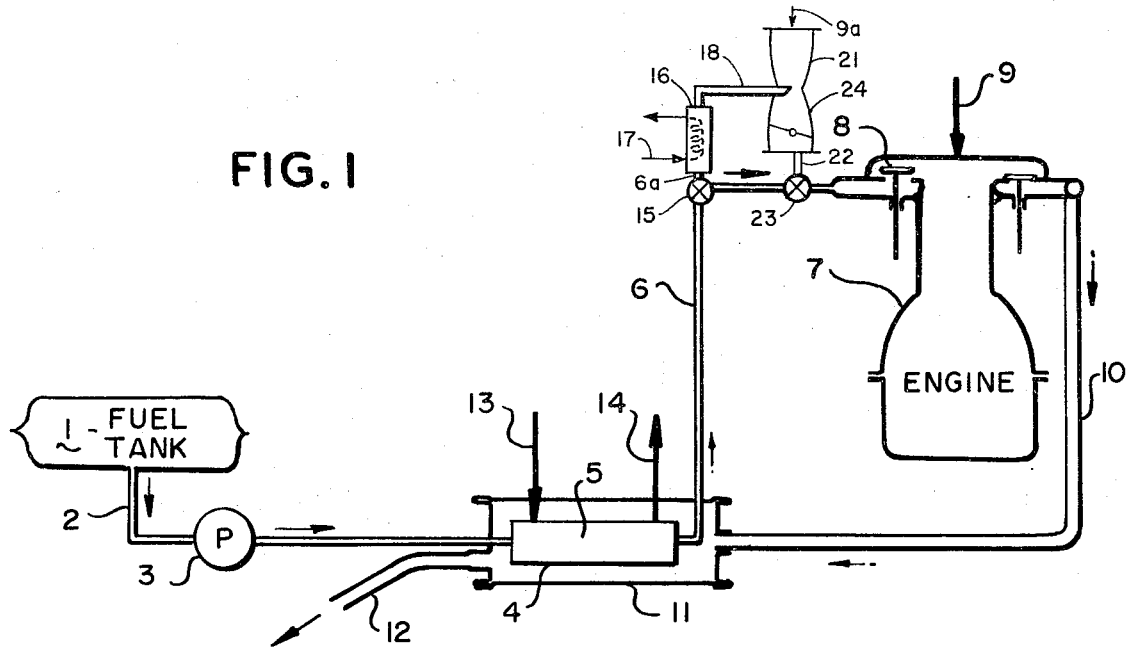
Figure 1:
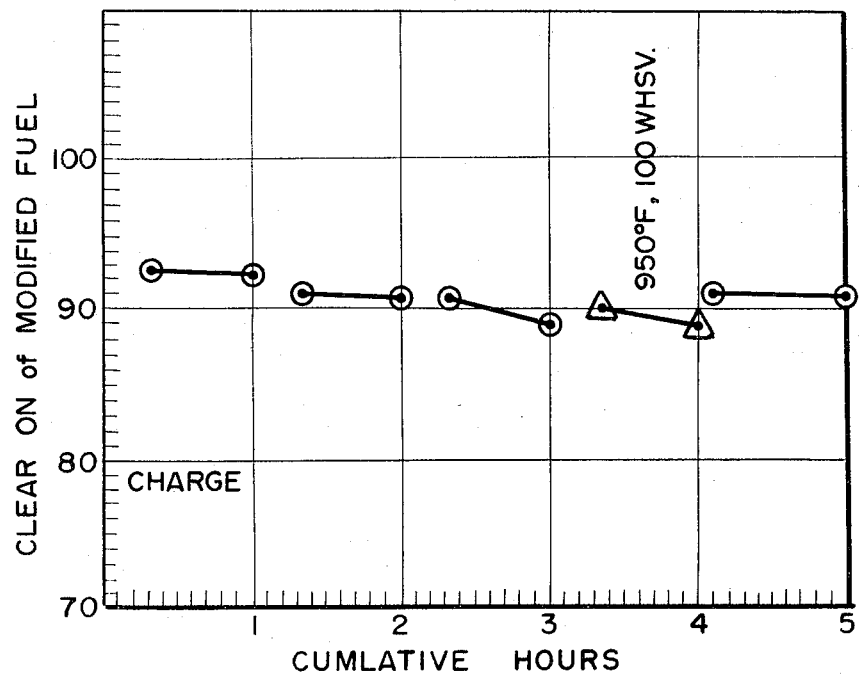

As pointed out above, in the operation of high compression ratio combustion engines it is desirable for best results to use specially refined high octane number fuels. This invention therefore deals with a procedure involving a method for passage of a low grade fuel through a catalytic converter prior to introduction into an engine system so that high octane number equivalent engine operation is achieved with a relatively low octane number fuel. This is achieved by use of a catalytic converter system which, in combination with the engine, is effective to convert relatively low octane number fuel to high octane number fuel without prior expensive processing and without the addition of additives in order to obtain high octane performance.

As this invention is considered particularly useful in combination with an internal combustion engine, it will be specifically described with respect to that embodiment. However, it will be clear that other types of engines such as turbines may be used.

Thus, the system of this invention uses a low octane number fuel, a chamber containing a special class of catalyst, an engine, means for flowing at least a portion of the raw fuel through the catalyst chamber, means for flowing at least a portion of the chamber effluent to the engine as effective fuel, means for providing energy or heat for the catalyst chamber, and means for the occasional or periodic contact of the catalyst with a stream of air.

As indicated above, the general idea per se of employing a catalyst chamber ahead of an engine is not new. However, no practicable manageable solution has been provided in the past. In view of the prior art, the new pre-engine system of this invention provides the first system that can employ a manageably small catalyst chamber and the same will produce an unusually large octane number boost.

In a broad sense, the present development includes a catalyst chamber in combination with the above engine means, the chamber containing a catalyst comprising a crystalline aluminosilicate catalyst which has an alpha value of at least five and preferably of at least 20 and most preferred, an alpha number of at least 5000. The zeolite catalyst is of the ZSM-5 or ZSM-8 type in the most preferred embodiment. In a preferred embodiment, the crystalline aluminosilicate has a pore structure that has a "shape-selective" preference for admitting linear hydrocarbons such as normal-hexane, over hydrocarbons of other structural classes. The particular classes of such catalysts which may be employed in the novel system of the invention are fully described hereinafter.

It has been proposed heretofore, of course, to use various materials for the "shape-selective" reforming and cracking of naphthas and gasolines. In "shape-selective" reforming and "shape-selective" cracking for improving gasoline octane numbers however, the product objective is a liquid gasoline fraction with an improved octane number. This objective is generally obtained by catalytic conversion followed by separation of that product from gases which constitute the product of "shape-selective" conversion, which gases represent a yield loss in the operation. As opposed to this known procedure for "shape-selective" reforming and cracking of gasolines, in the present system the total liquid plus gaseous effluent emmanating from the catalytic conversion step is left unseparated and the total mixture represents the fuel to be fed to the engine. Not only does the production of gases represent no yield loss, but actually it serves as an important source of high octane fuel components to be burned in the engine.

With particular reference now to FIG. 1 accompanying the application, the system disclosed may be seen in a specific embodiment in combination with an internal combustion engine. Thus, in this system, raw fuel of a low octane number is contained in fuel tank 1 and is pumped by way of line 2 by pump 3 into the catalytic converter 4 containing catalysts for the conversion step. Catalytic converter 4 may be any type of container but preferably is constructed of such materials that can withstand temperatures of above about 600°F. for long periods of time and the catalytic reaction taking place therein. As indicated above, at least a portion of the catalytic converter 4 is packed with aluminosilicate catalytic material 5 as more specifically described herein for conversion of the fuel.

After conversion in the catalytic converter 4 by catalyst 5 the converted effluent is passed from the catalytic converter through line 6 into the intake manifold of an internal combustion engine 7. Thus, intake valve 8 introduces the effluent into the intake manifold for burning by the engine. Air may be introduced into the engine via line 9 to aid in supporting combustion.

As indicated above, it is also necessary to provide means for heating of the catalyst in order to effect the conversion. According to this embodiment, the catalytic converter 4 containing the catalyst is disposed within the manifold 11 of the engine so that the exhaust gases coming from the engine 7 will contact the converter 4 and thereby provide a source of heat needed for the cracking process occuring within the catalyst chamber by indirect heat exchange therewith. The partially cooled exhaust gases will then be vented by line 12 to the atmosphere.

As it is also necessary to provide means for catalyst regeneration and prolonging the life of the catalyst during the fuel conversion process, it is desirable to periodically or continuously contact the catalyst with a source of air. This may be effected by passing air in contact with the catalyst via line 13 and removal of excess air by line 14.

While it would be highly desirable to introduce air over the catalyst with the fuel, this would not appear to be attractive as the hot gases formed at the cracking temperatures on contact with air, could possibly generate a flame at that point and use up the energy of the fuel before it reaches the engine cylinder. Accordingly, the hot gases should be mixed with the air only after introduction into the engine. Alternatively the hot gases could (1) be mixed with the air stream with such rapidity that the mixture is below the flame propagation temperature, (2) cooled prior to mixing with the air, or (3) mixed with the air stream along an extended path.

The second alternative is shown in FIG. 1. By operating the selector valve 15, the hot gases are diverted into line 6a and into cooler 16 where condenser water 17 from the radiator of the engine 7 reduces the temperature of the hot gases below their flash point. The cooled gases pass through line 18 and enter diagrammatically illustrated carburetor 21 wherein the cooled gases are mixed with carburetor air entering through line 9a. The cooled gas-air mixture, metered by throttle 24, returns through line 22 to line 6 at selector valve 23 and passes into the intake manifold of engine 7 through valve 8. A particularly attractive aspect of this system is that it is capable of doing away with the need for a carburetion system. Thus, by introducing a measured amount of air directly into the intake manifold for mixing with the fuel, a system similar to the so-called fuel injection system is obtained without the need for the fuel injection requirement of atomization of the liquid gasoline being fed since the fuel here is gaseous. Therefore, this system combines the advantages of the fuel injection system with a carburetion system but without the disadvantages.

In operation, a fuel of heavier than gasoline average molecular weight is preferably employed. For example, the butane and pentane content of standard gasoline can be removed by the present invention to any degree, or entirely, which leads to a lower gasoline volatility for storage, transportation and lower pollution emissions by evaporative losses. Nevertheless, the pre-engine fuel converter of this invention, using such gasolines, will still provide sufficient volatility, unusually good distribution of fuel in the engine and added octane number performance equal to or better than what would be lost due to the elimination of the butanes. There may also be used heavier than gasoline components such as kerosene fractions thereby making products of this type available for reciprocating engine use. The preconverter thus produces an engine fuel of adequate volatility and octane number performance.

The zeolitic catalyst employed in the catalytic converter is described hereinafter and there it will be noted that certain critical aspects should be observed in the selection of the catalyst. Thus, the significance of the alpha value of the catalyst is important as non-zeolite catalysts with alpha values in excess of about 1 are not available. In such catalysts, for example when non-zeolitic silica alumina is used to provide sufficient pre-engine conversion to effectively upgrade octane numbers, it requires a vessel fitted with twenty or more quarts of catalyst, all of which must then be heated to temperatures of at least 1000°F. In contrast, the zeolite catalysts as specified herein are effective in amounts of four quarts or less.

The "shape-selectivity" of the zeolite catalyst is also important. Thus, zeolite catalysts with selective preference to linear hydrocarbons preferentially convert the lowest octane number component of the primary fuel to high octane gaseous fuel products. The amount of octane number improvement due to the same amount of catalytic conversion work is therefore far greater. Also the inadmissibility of cyclic hydrocarbons lessens the tendency for the catalyst to produce coke and thereby materially lengthens the duration of the practically useful cycle of catalyst activity.

Generally, any crystalline aluminosilicate zeolite catalyst which satisfies the above criteria may be employed in the system. Many catalysts of this type are known in the art and may be characterized as crystalline zeolites, the term zeolite being applied to hydrated alumino silicates that contain easily exchangeable ions such as sodium and potassium. Pore sizes of the zeolites may range from 5 to about 9 Angstroms in diameters. Particularly preferred catalysts of this type are those known as ZSM-5 and ZSM-8, particularly described hereinafter, as well as zeolite 5A, exchanged erionite, etc., including mixtures thereof. The ZSM-5 and ZSM-8 zeolites are however, highly preferred for use in the present invention.

The family of ZSM-5 type compositions, useful in the novel process of this invention, has the characteristic X-ray diffraction pattern set forth in Table I, hereinbelow. ZSM-5 compositions can also be identified, in terms of mole ratios of oxides, as follows:

$0.9 \pm 0.2 M_{2/n}O : W_2O_3 : 5-100 \, YO_2 : z \, H_2O$ wherein M is a cation, $n$ is the valence of said cation, W is selected from the group consisting of aluminum and gallium, Y is selected from the group consisting of silicon and germanium, and $z$ is from 0 to 40. In a preferred synthesized form, the zeolite has a formula, in terms of mole ratios of oxides, as follows:

$0.9 \pm 0.2 \, M_{2/n}O : Al_2O_3 : 5-100 \, SiO_2 : z \, H_2O$ and M is selected from the group consisting of a mixture of alkali metal cations, especially sodium, and tetraalkylammonium cations, the alkyl groups of which preferably contain 2-5 carbon atoms.

In a preferred embodiment of ZSM-5, W is aluminum, Y is silicon and the silica/alumina mole ratio is at least 10 and ranges up to about 60.

Members of the family of ZSM-5 zeolites possess a definite distinguishing crystalline structure whose X-ray diffraction pattern shows the following significant lines:

TABLE I

| Interplanar Spacing $d$(A) | Relative Intensity |
|---|---|
| 11.1 ± 0.2 | S |
| 10.0 ± 0.2 | S |
| 7.4 ± 0.15 | W |
| 7.1 ± 0.15 | W |
| 6.3 ± 0.1 | W |
| 6.04 ± 0.1 | W |
| 5.97 ± 0.1 | W |
| 5.56 ± 0.1 | W |
| 5.01 ± 0.1 | W |
| 4.60 ± 0.08 | W |
| 4.25 ± 0.08 | W |
| 3.85 ± 0.07 | VS |
| 3.71 ± 0.05 | S |
| 3.64 ± 0.05 | M |
| 3.04 ± 0.03 | W |
| 2.99 ± 0.02 | W |
| 2.94 ± 0.02 | W |

These values as well as all other X-ray data were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these, the relative intensities, 100 I/I, where I is the intensity of the strongest line or peak, and $d$ (obs.), the interplanar spacing in A, corresponding to the recorded lines, were calculated. In Table I the relative intensities are given in terms of the symbols S = strong, M = medium, MS = medium strong, MW = medium weak and VS = very strong. It should be understood that this X-ray diffraction pattern is characteristic of all the species of ZSM-5 compositions. Ion exchange of the sodium ion with cations reveals substantially the same pattern with some minor shifts in interplanar spacing and variation in relative intensity. Other minor variations can occur depending on the silicon to aluminum ratio of the particular sample, as well as if it had been subjected to thermal treatment. Various cation exchanged forms of ZSM-5 have been prepared. X-ray powder diffraction patterns of several of these forms are set forth below. The ZSM-5 forms set forth below are all aluminosilicates.

TABLE 2

X-Ray Diffraction
ZSM-5 Powder in Cation Exchanged Forms
d Spacings Observed

| As Made | HCl | NaCl | CaCl$_2$ | ReCl$_3$ | AgNO$_3$ |
|---|---|---|---|---|---|
| 11.15 | 11.16 | 11.19 | 11.19 | 11.19 | 11.19 |
| 10.01 | 10.03 | 10.05 | 10.01 | 10.06 | 10.01 |
| 9.74 | 9.78 | 9.80 | 9.74 | 9.79 | 9.77 |
| — | — | 9.01 | 9.02 | — | 8.99 |
| 8.06 | — | — | — | — | — |
| 7.44 | 7.46 | 7.46 | 7.46 | 7.40 | 4.46 |
| 7.08 | 7.07 | 7.09 | 7.11 | — | 7.09 |
| 6.70 | 6.72 | 6.73 | 6.70 | 6.73 | 6.73 |
| 6.36 | 6.38 | 6.38 | 6.37 | 6.39 | 6.37 |
| 5.99 | 6.00 | 6.01 | 5.99 | 6.02 | 6.01 |
| 5.70 | 5.71 | 5.73 | 5.70 | 5.72 | 5.72 |
| 5.56 | 5.58 | 5.58 | 5.57 | 5.59 | 5.58 |
| 5.37 | — | 5.38 | 5.37 | 5.38 | 5.37 |
| 5.13 | 5.11 | 5.14 | 5.12 | 5.14 | — |
| 4.99 | 5.01 | 5.01 | 5.01 | 5.01 | 5.01 |
| — | — | 4.74 | — | — | — |
| 4.61 | 4.62 | 4.62 | 4.61 | 4.63 | 4.62 |
| — | — | 4.46 | 4.46 | — | 4.46 |
| 4.36 | 4.37 | 4.37 | 4.36 | 4.37 | 4.37 |
| 4.26 | 4.27 | 4.27 | 4.26 | 4.27 | 4.27 |
| 4.08 | — | 4.09 | 4.09 | 4.09 | 4.09 |
| 4.00 | 4.01 | 4.01 | 4.00 | 4.01 | 4.01 |
| 3.84 | 3.85 | 3.85 | 3.85 | 3.86 | 3.86 |
| 3.82 | 3.82 | 3.82 | 3.82 | 3.83 | 3.82 |
| 3.75 | 3.75 | 3.75 | 3.76 | 3.76 | 3.75 |
| 3.72 | 3.72 | 3.72 | 3.72 | 3.72 | 3.72 |
| 3.64 | 3.65 | 3.65 | 3.65 | 3.65 | 3.65 |
| — | 3.60 | 3.60 | 3.60 | 3.61 | 3.60 |
| 3.48 | 3.49 | 3.49 | 3.48 | 3.49 | 3.49 |
| 3.44 | 3.45 | 3.45 | 3.44 | 3.45 | 3.45 |
| 3.34 | 3.35 | 3.36 | 3.35 | 3.35 | 3.35 |
| 3.31 | 3.31 | 3.32 | 3.31 | 3.32 | 3.32 |
| 3.25 | 3.25 | 3.26 | 3.25 | 3.25 | 3.26 |
| 3.17 | — | — | 3.17 | 3.18 | — |
| 3.13 | 3.14 | 3.14 | 3.14 | 3.15 | 3.14 |
| 3.05 | 3.05 | 3.05 | 3.04 | 3.06 | 3.05 |
| 2.98 | 2.98 | 2.99 | 2.98 | 2.99 | 2.99 |
| — | — | — | — | 2.97 | — |
| — | 2.95 | 2.95 | 2.94 | 2.95 | 2.95 |
| 2.86 | 2.87 | 2.87 | 2.87 | 2.87 | 2.87 |
| 2.80 | — | — | — | — | — |
| 2.78 | — | — | 2.78 | — | 2.78 |
| 2.73 | 2.74 | 2.74 | 2.73 | 2.74 | 2.74 |
| 2.67 | — | — | 2.68 | — | — |
| 2.66 | — | — | 2.65 | — | — |
| 2.60 | 2.61 | 2.61 | 2.61 | 2.61 | 2.61 |
| — | 2.59 | — | 2.59 | — | — |
| 2.57 | — | 2.57 | 2.56 | — | 2.57 |
| 2.50 | 2.52 | 2.52 | 2.52 | 2.52 | — |
| 2.49 | 2.49 | 2.49 | 2.49 | 2.49 | 2.49 |
| — | — | — | 2.45 | — | — |
| 2.41 | 2.42 | 2.42 | 2.42 | 2.42 | — |
| 2.39 | 2.40 | 2.40 | 2.39 | 2.40 | 2.40 |
| — | — | — | 2.38 | 2.35 | 2.38 |
| — | 2.33 | — | 2.33 | 2.32 | 2.33 |
| — | 2.30 | — | — | — | — |
| — | 2.24 | 2.23 | 2.23 | — | — |
| — | 2.20 | 2.21 | 2.20 | 2.20 | — |
| — | 2.18 | 2.18 | — | — | — |
| — | — | 2.17 | 2.17 | — | — |
| — | 2.13 | — | 2.13 | — | — |
| — | 2.11 | 2.11 | — | 2.11 | — |
| — | — | — | 2.10 | 2.10 | — |
| — | 2.08 | 2.08 | — | 2.08 | 2.08 |
| — | — | 2.07 | 2.07 | — | — |
| — | — | — | 2.04 | — | — |
| 2.01 | 2.01 | 2.01 | 2.01 | 2.01 | 2.01 |
| 1.99 | 2.00 | 1.99 | 1.99 | 1.99 | 1.99 |
| — | — | — | 1.97 | 1.96 | — |
| 1.95 | 1.95 | 1.95 | 1.95 | 1.95 | — |

TABLE 2-Continued

X-Ray Diffraction
ZSM-5 Powder in Cation Exchanged Forms
d Spacings Observed

| As Made | HCl | NaCl | CaCl$_2$ | ReCl$_3$ | AgNO$_3$ |
|---|---|---|---|---|---|
| — | — | — | — | 1.94 | — |
| — | 1.92 | 1.92 | 1.92 | 1.92 | 1.92 |
| 1.91 | — | — | — | 1.91 | — |
| — | — | — | — | 1.88 | — |
| 1.87 | 1.87 | 1.87 | 1.87 | 1.87 | 1.87 |
| — | 1.86 | — | — | — | — |
| 1.84 | 1.84 | — | — | 1.84 | 1.84 |
| 1.83 | 1.83 | 1.83 | 1.83 | 1.83 | — |
| 1.82 | — | 1.81 | — | 1.82 | — |
| 1.77 | 1.77 | 1.79 | 1.78 | — | 1.77 |
| 1.76 | 1.76 | 1.76 | 1.76 | 1.76 | 1.76 |
| — | — | 1.75 | — | — | 1.75 |
| — | 1.74 | 1.74 | 1.73 | — | — |
| 1.71 | 1.72 | 1.72 | 1.71 | — | 1.70 |
| 1.67 | 1.67 | 1.67 | — | 1.67 | 1.67 |
| 1.66 | 1.66 | — | 1.66 | 1.66 | 1.66 |
| — | — | 1.65 | 1.65 | — | — |
| — | — | 1.64 | 1.64 | — | — |
| — | 1.63 | 1.63 | 1.63 | 1.63 | 1.62 |
| — | 1.61 | 1.61 | 1.61 | — | 1.61 |
| 1.58 | — | — | — | — | — |
| — | 1.57 | 1.57 | — | 1.57 | 1.57 |
| — | — | 1.56 | 1.56 | 1.56 | — |

Zeolite ZSM-5 can be suitably prepared by preparing a solution containing tetrapropyl ammonium hydroxide, sodium oxide, an oxide of aluminum or gallium, an oxide of silica or germanium, and water and having a composition, in terms of mole ratios of oxides, falling within the following ranges:

TABLE 3

| | Broad | Preferred | Particularly Preferred |
|---|---|---|---|
| OH$^-$/SiO | 0.07–1.0 | 0.1–0.8 | 0.2–0.75 |
| R$_4$N+/(R$_4$N$^+$+Na$^+$) | 0.2–0.95 | 0.3–0.9 | 0.4–0.9 |
| H$_2$O/OH$^-$ | 10–300 | 10–300 | 10–300 |
| YO$_2$/W$_2$O$_3$ | 5–100 | 10–60 | 10–40 | wherein R is propyl, W is aluminum or gallium and Y is silicon of germanium maintaining the mixture until crystals of the zeolite are formed. Thereafter, the crystals are separated from the liquid and recovered. Typical reaction conditions consist of heating the foregoing reaction mixture to a temperature of from about 150°C to 175°C for a period of time of from about 6 hours to 60 days. A more preferred temperature range is from about 160° to 175°C with the amount of time at a temperature in such range being from about 12 hours to 8 days.

The digestion of the gel particles is carried out until crystals form. The solid product is separated from the reaction medium, as by cooling the whole to room temperature, filtering, and water washing.

The foregoing product is dried, e.g., at 230°F, for from about 8 to 24 hours. Of course, milder conditions may be employed if desired, e.g., room temperature under vacuum.

ZSM-5 is preferably formed as an aluminosilicate. The composition can be prepared utilizing materials which supply the appropriate oxide. Such compositions include for an aluminosilicate, sodium aluminate, alumina, sodium silicate, silica hydrosol, silica gel, silicic acid, sodium hydroxide and tetrapropylammonium hydroxide. It will be understood that each oxide component utilized in the reaction mixture for preparing a member of the ZSM-5 family can be supplied by one or more initial reactants and they can be mixed together in any order. For example, sodium oxide can be supplied by an aqueous solution of sodium hydroxide, or by an aqueous solution of sodium silicate; tetrapropylammonium cation can be supplied by the bromide salt. The reaction mixture can be prepared either batchwise or continuously. Crystal size and crystallization time of the ZSM-5 composition will vary with the nature of the reaction mixture employed. ZSM-5 is disclosed and claimed in Ser. No. 865,472, filed Oct. 10, 1969.

Another operable zeolite falling within the above class is zeolite ZSM-8 which is described and claimed in Ser. No. 865,418, filed Oct. 10, 1969.

ZSM-8 can also be identified, in terms of mole ratios of oxides, as follows:

$0.9 \pm 0.2\ M_2^{n}O : Al_2O_3 : 5-100\ SiO_2 : z\ H_2O$ wherein M is at least one cation, $n$ is the valence thereof and $z$ is from 0 to 40. In a preferred synthesized form, the zeolite has a formula, in terms of mole ratios of oxides, as follows:

$0.9 \pm 0.2\ M_2^{n}O : Al_2O_3 : 10-60\ SiO_2 : z\ H_2O$ and M is selected from the group consisting of a mixture of alkali metal cations, especially sodium, and tetraethylammonium cations.

ZSM-8 possesses a definite distinguishing crystalline structure having the following X-ray diffraction pattern:

TABLE 4

| $d$A° | I/I$_o$ | I/I$_o$ | $d$A° |
|---|---|---|---|
| 11.1 | 46 | 4 | 2.97 |
| 10.0 | 42 | 3 | 2.94 |
| 9.7 | 10 | 2 | 2.86 |
| 9.0 | 6 | 1 | 2.78 |
| 7.42 | 10 | 4 | 2.73 |
| 7.06 | 7 | 1 | 2.68 |
| 6.69 | 5 | 3 | 2.61 |
| 6.35 | 12 | 1 | 2.57 |
| 6.04 | 6 | 1 | 2.55 |
| 5.97 | 12 | 1 | 2.51 |
| 5.69 | 9 | 6 | 2.49 |
| 5.56 | 13 | 1 | 2.45 |
| 5.36 | 3 | 2 | 2.47 |
| 5.12 | 4 | 3 | 2.39 |
| 5.01 | 7 | 1 | 2.35 |
| 4.60 | 7 | 1 | 2.32 |
| 4.45 | 3 | 1 | 2.28 |
| 4.35 | 7 | 1 | 2.23 |
| 4.25 | 18 | 1 | 2.20 |
| 4.07 | 20 | 1 | 2.17 |
| 4.00 | 10 | 1 | 2.12 |
| 3.85 | 100 | 1 | 2.11 |
| 3.82 | 57 | 1 | 2.08 |
| 3.75 | 25 | 1 | 2.06 |
| 3.71 | 30 | 6 | 2.01 |
| 3.64 | 26 | 6 | 1.99 |
| 3.59 | 2 | 2 | 1.95 |
| 3.47 | 6 | 2 | 1.91 |
| 3.43 | 9 | 3 | 1.87 |
| 3.39 | 5 | 1 | 1.84 |
| 3.34 | 18 | 2 | 1.82 |
| 3.31 | 8 | | |
| 3.24 | 4 | | |
| 3.13 | 3 | | |
| 3.04 | 10 | | |
| 2.99 | 6 | | |

Zeolite ZSM-8 can be suitably prepared by reacting a solution containing either tetraethylammonium hydroxide or tetraethylammonium bromide together with sodium oxide, aluminum oxide, and an oxide of silica and water.

The relative operable proportions of the various ingredients have not been fully determined and it is to be immediately understood that not any and all proportions of reactants will operate to produce the desired zeolite. In fact, completely different zeolites can be prepared utilizing the same starting materials depending upon their relative concentration and reaction conditions as is set forth in U.S. Pat. No. 3,308,069. In general, however, it has been found that when tetraethylammonium hydroxide is employed, ZSM-8 can be prepared from said hydroxide, sodium oxide, aluminum oxide, silica and water by reacting said materials in such proportions that the forming solution has a composition in terms of mole ratios of oxides falling within the following range $SiO_2/Al_2O_3$ - from about 10 to about 200

$Na_2O$/tetraethylammonium hydroxide — from about 0.05 to 0.20

Tetraethylammonium hydroxide/$SiO_2$ — from about 0.08 to 1.0

$H_2O$/tetraethylammonium hydroxide — from about 80 to about 200

Thereafter, the crystals are separated from the liquid and recovered. Typical reaction conditions consist of heating the foregoing reaction mixture to a temperature of from about 100°C to 175°C for a period of time of from about six hours to 60 days. A more preferred temperature range is from about 150° to 175°C with the amount of time at a temperature in such range being from about 12 hours to 8 days.

The digestion of the gel particles is carried out until crystals form. The solid product is separated from the reaction medium, as by cooling the whole to room temperature, filtering, and water washing.

The foregoing product is dried, e.g., at 230°F, for from about 8 to 24 hours. Of course, milder conditions may be employed if desired, e.g., room temperature under vacuum.

ZSM-8 is prepared utilizing materials which supply the appropriate oxide. Such compositions include sodium aluminate, alumina, sodium silicate, silica hydrosol, silica gel, silicic acid, sodium hydroxide and tetraethylammonium hydroxide. It will be understood that each oxide component utilized in the reaction mixture can be supplied by one or more initial reactants and they can be mixed together in any order. For example, sodium oxide can be supplied by an aqueous solution of sodium hydroxide, or by an aqueous solution of sodium silicate, tetraethylammonium cation can be supplied by the bromide salt. The reaction mixture can be prepared either batchwise or continuously.

The zeolites used in the instant invention can have the original cations associated therewith replaced by a wide variety of other cations according to techniques well known in the art. Typical replacing cations would include hydrogen, ammonium and metal cations including mixtures of the same.

Typical ion exchange techniques would be to contact the particular zeolite with a salt of the desired replacing cation or cations. Although a wide variety of salts can be employed, particular preference is given to chlorides, nitrates and sulfates.

Representative ion exchange techniques are disclosed in a wide variety of patents including U.S. Pat. No. 3,140,249; U.S. Pat. No. 3,140,251; and U.S. Pat. No. 3,140,253.

Following contact with the salt solution of the desired replacing cation, the zeolites are then preferably washed with water and dried at a temperature ranging from 150°F. to about 600°F. and thereafter calcined in air or other inert gas at temperatures ranging from about 500°F. to 1500°F. for periods of time ranging from 1 to 48 hours or more.

Prior to use, the zeolites should be dehydrated at least partially. This can be done by heating to a temperature in the range of 400° to 1100°C. in an atmosphere, such as air, nitrogen, etc. and at atmospheric or subatmospheric pressures for between 1 and 48 hours. Dehydration can also be performed at lower temperatures merely by using a vacuum, but a longer time is required to obtain a sufficient amount of dehydration.

In the system of this invention, the use of relatively high temperatures of operation namely, about 600°–1500°F., in combination with the above critical parameters for the catalyst leads to an operation with long operating cycles between catalyst regenerations. Further, the use of the zeolite structures that will allow an appreciable rate of penetration of monomethyl-paraffins, in addition to normal paraffins, but will provide considerable discrimination against napthene and aromatic hydrocarbons, leads to an attractive embodiment of the system having good conversion capabilities and long cycle capabilities between regeneration.

An extremely important embodiment of the invention resides in the combined use of high temperatures and high alpha catalysts. This combination results in improved catalyst cycle life between regenerations. Thus, a preferred aspect of the invention would be the use of catalysts having an alpha value of at least 5,000 or higher and operating at temperatures of at least 900°F. or higher.

The zeolite catalyst proposed herein has been found to particularly well fulfill requirements for suitable use with automotive engines in terms of activity, stability, regenerability and long single cycle life. As indicated, the catalyst is essentially a "shape-selective" cracking catalyst; however, it has been shown to absorb large molecules such as cyclohexane and to crack other low-octane components such as singly branched paraffins and to alkylate aromatics to alkyl aromatics which again improve the octane rating.

The basic novelty of the system of the present invention is that it allows the on-site conversion by the consumer of low grade gasolines to hydrocarbon gases of high octane number which can be directly burned in the automotive engine. Generally, these regular grade gasolines are cracked by the hydrocarbon converter so that the fuel fed to the engine consists primarily of propane, propylene, butane and pentane which are gaseous at the temperatures employed. Therefore, those heavier components, which can be source of noxious fumes formed in conventional engines are introduced into the engines in fully vaporized form and therefore no objectionable exhaust gases are emitted. Thus, the system provides a direct solution to problems of pollution in combustion engines.

A number of alternative embodiments can be utilized in operation of the system of this invention. One of these alternatives involves a procedure by which the catalyst in the catalytic converter is maintained at the proper strength and also maintained at the required temperature effective to convert the gasoline. One such procedure is use of a two-catalyst bed system whereby alternate regeneration can be accomplished by the use of air directly, by the air stream prior to mixing of the fuel, or by use of the engine exhaust.

The catalyst used herein is stable to 19,000°F. and has a high activity such that the reactor may be operated at a 50–200 liquid hourly space velocity. Thus, the volume of the pre-engine reactor for a 6-or 8-cylinder automotive engine would be smaller than that of a conventional oil filter used with such engines at the present time.

There are also a number of specific aspects of the overall engine system which must be observed. One of these is the cold start of the engine when the engine and catalyst are in cold condition. Since the catalyst system is effective only when the temperature is above 600°F. several steps should be taken during the cold start period to insure satisfactory operation of the engine. These could involve one or more of the following steps.

1. Use of flame or electrical heating to raise the reactor temperature quickly before start-up of the engine. The most adaptable procedure by this method would be made by electrical heating using the automobile battery as the source of the electrical heat.

2. Use of high octane concentrates, or concentrated anti-knocking agents which would be by a two-fuel system or a resorvoir of anti-knocking agents and by-passing the catalytic system during the warm up period. In this system, when the engine was cold, it would be adapted to operate on high octane gasolines as in the present automotive engine. This would require however use of a two-fuel system in the overall automotive operation.

3. Placing the catalytic reactor inside the engine exhaust manifold to achieve fast heat exchange between the hot exhaust and the catalytic system including preheating the fuel. This is probably the most attractive embodiment for operation of the cold start and is the embodiment illustrated in the drawing and discussed above. Thus, on initial start of the engine, wherein the low octane fuel was introduced and burned and the catalytic reactor is maintained inside the engine exhaust manifold, the heat from the exhaust would quickly heat the catalyst reactor to the required temperature to begin its conversion of the low octane gasoline to the desired high octane fuel.

In the normal operation and maintenance of this system, thermal stability and high activity permit the catalytic system to be operated over a wide range of temperatures and space velocities. Thus, a catalytic system designed to satisfy the fuel demand at full throttle would be expected to satisfy all other driving conditions without specific controls or regulators. The octane demand is highest only during acceleration of above 30 m.p.h. and an alternate design of the reactor system would be to partition the catalyst bed into parallel channels and to allow all the catalyst to participate in the reaction during the full throttle, while during cruising or at low speeds, only part of the catalyst would be exposed to fuel, the other part being regenerated by the exhaust or a separate source of air. A third alternative would be to use the two-fuel system or a reservoir of anti-knocking agents specifically during the cold start period and under full throttle conditions.

This system as described herein could be incorporated into present automotive engines with minor modifications. The major modification of the conventional automotive engine would be in the area of carburetion. In fact carburetion would no longer be necessary as the modified fuel from the catalytic system would normally be a hot vapor which could be mixed with cold air or be heat exchanged with cold air and then mixed before entering the intake manifold, or in the manifold. The air intake system may also be modified and re-routed to complement the catalytic system. An obvious advantage of an all-vapor fuel is the elimination of octane distribution problems as found in conventional carburetion systems.

Since the performance of the engine is only dependent on the quality of the modified fuel and not so much on the quality of incoming fuel, with the proper choice of catalyst a broad range of fuels in addition to conventional gasoline could be accepted. In a "shape-selective" catalytic system, fuels of low octane rating due to high normal-paraffin content can be upgraded. In a cracking catalyst system, fuels boiling in the kerosene or even gas-oil range may be converted to high performance gasoline. In a cracking-dehydrogenation system, naphthenes and substituted napthenes may be converted to aromatic, alkylaromatics, olefins and hydrogen, all suggesting high octane rating. Because the fuel is in a vapor state after the catalytic conversion, the problem of carburetion is eliminated and fuel components boiling above the conventional gasoline range may now be used.

The pre-engine catalytic system of this invention shifts the production of high performance gasoline fuel from the refiners to the consumer and shifts the method of obtaining high performance fuel from adding lead or increasing reforming severity to using light gaseous hydrocarbons without the disadvantages of shipping, storing or handling of light gases per se. Also using the pre-engine catalytic system, high compression engines can be operated with presently available fuel without the addition of lead. This could materially alter the huge economic burden on the petroleum industry of capital investment and added reforming and would conserve crude resources by elimination of a major part of material losses due to limited reformer yields. Further, as lead is a serious roadblock to a satisfactory exhaust converter system, its elimination substantially or totally by this invention would provide an accelerated solution to the hydrocarbon and carbon monoxide pollution problems from auto exhausts.

The following examples are presented to illustrate the present invention.

EXAMPLE I

In this experiment a synthetic $C_6$ reformate was converted over an acid exchanged ZSM-5 zeolite catalyst. The $C_6$ reformate charge was of the following composition:

| COMPONENT | % BY VOLUME |
|---|---|
| 2,2-Dimethylbutane | 10.5% |
| 2,3-Dimethylbutane | 6.2% |
| 2-Methylpentane | 15.3% |
| n-Hexene-1 | 5.8% |
| Benzene | 40.4% |
| n-Hexane | 21.8% |

This composition had an octane number (ON) of 77.1.

In this experiment, the above charge was converted by passage over an acid exchanged ZSM-5 zeolite at 100-200 WHSV at 900°-950°F. More precisely, the reaction was conducted at 100 WHSV and 900°F. and the characteristics of the final product were noted below.

Octane Improvement--The synthetic reformate has a calculated clear octane number (R+O) of 77.1. [The measured micro-octane number is 77.6 (R+O)]. At 100 WHSV and 900°F. the modified fuel obtained had an initial clear octane number of 92.3, calculated from the composition of products. Thus, a gain of 15.2 octane numbers was achieved by conversion over the zeolite.

This gain in octane number was achieved by: (1) cracking 62.9 wt. percent of the n-hexane and 12.5 wt. percent of the 2-methylpentane and 2,3-dimethylbutane to $C_4$-olefins and paraffins and (2) alkylating 19.5 wt. percent of the benzene to $C_7$ to $C_{10}$ alkyl aromatics. A negligible amount of 2,2-dimethylbutane was converted.

The modified fuel thus contains 20.3 vol.% ≤ $C_3$'s and 3.6 vol. % $C_4$'s and 76.1 vol. % $C_6^+$'s.

The catalyst life of the catalyst is set forth in FIG. 2 in the drawing accompanying the application wherein the octane of the final product versus on-stream time at 900°F. and 100 WSHV is illustrated. The cumulative running time was 5 hours.

In the graph of FIG. 2, it will be seen that the activity of the catalyst showed only a slight decrease during the first five hours of test. These experiments were conducted in one-hour segments. In between runs, the reactor was cooled to room temperature and was either blocked, or open to the atmosphere.

In view of the above it will be seen that a significant increase in octane number was achieved employing the catalytic conversion concept of the invention.

EXAMPLE II

The principles of the invention can be demonstrated by mock-up of a high compression internal combustion automotive engine operated on fuel produced in the system of the invention. In this arrangement the catalytic conversion system and charge of Example I are connected to the intake manifold of the engine and the gaseous product introduced into the intake manifold, together with the requisite amount of air for operation of the engine. The engine operates successfully and only minor motor-ping can be detected.

EXAMPLE III

In this experiment an 86.0 (R+O) octane number 400°F. End point reformate from a platinum reformer was converted over an acid exchanged ZSM-5 zeolite catalyst. The catalyst had an alpha value of 13,000. The charge stock has the following analysis:

| | | |
|---|---|---|
| Average molecular weight | 96.5 | |
| Octane number | (Lead free) | Research method — 86.0 |
| Paraffins | 57.3 wt.% | |
| Olefins | 1.1 | Motor method — 79.5 |
| Alkylbenzenes | 38.6 | |

-Continued

Others (by difference)     3.0
                                    100.0

The experiment was carried out in the same manner as in Example I. The liquid product was collected and its octane number measured by the standard octane rating engine. The gaseous product was analyzed by the gas chromatographic method. A calculated octane number of 92.4 (R+O) was obtained by combining the octane values of the individual gases with the measured octane value of the liquid product. Thus a gain of 6.4 octane numbers was achieved by conversion over the zeolite.

EXAMPLE IV

In this experiment an 81.2 (R+O) reformate from a platinum reformer was used, the test procedure was the same as in Example III. The charge stock has the following analysis:

| | |
|---|---|
| Average molecular weight | 89.2 |
| Paraffins | 68.3 wt% |
| Olefins | 1.5 |
| Alkylbenzenes | 29.4 |
| Others (by difference) | 0.8 |
| | 100.0 |

The octane rating of the liquid product and that of the modified fuel (liquid plus gas) are shown as follows:

| On Stream Time | Liquid Only | Modified Fuel |
|---|---|---|
| 20 min. | 91.3 | 93.8 |
| 3 hr. 40 min. | 88.7 | 90.8 |

A gain of 12.6 and 9.6 octane numbers over the reformate charge was realized.

EXAMPLE V

In this experiment, the same reformate used in Example III was vaporized at 915°F. and the vapor charged into the intake manifold of a standard knock test engine (ASTM-CFR engine) designed to measure the octane number of fuels for use in spark ignition engines according to the Motor Method (ASTM D357 – 18). (For details of test method, refer to IP Standards for Petroleum and its products. Part II. Methods for Rating Fuels - Engine Tests. pp. 1–22, Second Edition, Oct., 1960. Published by Institute of Petroleum, New Cavendish Street, London, W.1.). The vaporization step was carried out in a catalytic unit wherein 36cc of 8/14 mesh Vycor chips instead of the catalyst were placed in the reactor section. The motor O.N. of the vaporized fuel as determined by the engine was 79.5 (M+O). The result indicated that vaporization alone did not raise the octane number of the reformate.

EXAMPLE VI

The experiment was carried out in the same equipment as described in Example V, except that 24 cc. (12 grams) of a calcined (16 hours at 960°F. in air) acid exchanged ZSM-5 zeolite catalyst (20/40 mesh) were mixed with 12 cc. of 8/14 mesh Vycor chips and placed in the reactor. Prior to testing, the catalyst was pretreated for 30 minutes at 950°F. with a nitrogen purge gas. Then, the 79.5 (M+O) octane number reformate used in Example III was charged through the preheater and reactor at 38 ml/minute, (i.e., about 130 WHSV). The electrical heaters on the preheater and reactor were adjusted so that the catalyst bed temperature was maintained at 920°F. ± 10°F. The reactor products were collected in a receiver kept at 32°F. and the non-condensables vented. After running the reactor for about 35 minutes, the reactor effluent was diverted to the intake manifold of the engine via a needle valve, and the motor octane number of the reactor effluent was determined by the standard procedure. The octane number was again determined at about 65 minutes and 105 minutes on stream. The length of the continuous running time was limited by the size of fuel tank (4 liters) to about 110 minutes. After the run, the reactor was cooled to 800°F. and purged by nitrogen for 30 minutes while recharging the fuel tank. The run was repeated for a total of 9.6 hours of cumulated running time on the same catalyst without oxidative regeneration. Results expressed in terms of motor octane number (M+O) vs. hours of on-stream time indicated that a significant gain in octane number was achieved during the entire period of 9.6 hours, the gain being from 79.5 to 85.5.

EXAMPLE VII

The experiment of Examples V and VI was repeated with a Kuwait naphtha (40.5 motor O.N. MON). Without the catalyst, vaporization of the charge and thermal conversion gave a motor O.N. of 46; with the aged catalyst used in Example VI without regeneration, a motor O.N. rating of 62 was obtained indicating a gain of 21.5 octane numbers.

EXAMPLE VIII

To demonstrate the specificity of high alpha value catalyst, the experiment described in the previous example was repeated except that a commercial cracking catalyst, Durabead 8, (alpha value = 1) was used. The results showed that the motor O.N. of the reformate used in Example VI was raised from 79.5 to only 80 and the motor O.N. of the naphtha used in Example VII was raised to 51, i.e., only 5 octane numbers above that obtained by thermal conversion.

The invention has been described herein with reference to certain preferred embodiments but is not to be considered as limited thereto.

What is claimed is:

1. A combination of a combustion engine with means for the introduction of fuel into the engine for burning and operation of the engine, said means comprising a fuel tank containing fuel of relatively low octane number, means for passage of the fuel through a hydrocarbon catalytic converter operated at temperatures above about 600°F. and means for passage of the effluent from the hydrocarbon catalytic converter into the engine for burning, said catalytic converter containing a crystalline aluminosilicate catalyst having a pore structure that has a shape selective preference for admitting linear hydrocarbons over hydrocarbons of other structural classes and having an alpha value of at least 5, wherein the relatively low octane number fuel is converted into relatively high octane number fuel for operation of the engine.

2. A combination according to claim 1 wherein the fuel, after conversion in the hydrocarbon catalytic converter, is combined with air prior to introduction into the engine.

3. A combination according to claim 2 wherein the hydrocarbon catalytic converter is operated at a temperature between about 600°–15,000°F. and the catalyst is regenerated with air to prolong the life of the catalyst.

4. A combination according to claim 3 wherein the catalytic converter is disposed within the exhaust of an internal combustion engine and is heated by the exhaust gases.

5. A combination according to claim 4 wherein the effluent from the catalytic converter is introduced directly into the intake manifold of an internal combustion engine in combination with air to obviate the requirement for a carburetor.

6. A combination according to claim 5 wherein the catalyst is a crystalline aluminosilicate catalyst of the ZSM–5 type.

7. A method of operation of a combustion engine which comprises passing a relatively low octane number fuel through a hydrocarbon catalytic converter containing a crystalline aluminosilicate catalyst of the ZSM-5 type operated at a temperature of about 600°–1,500°F. a space velocity of 50–200 liquid volumes of fuel per volume of catalyst per hour wherein the low octane number fuel is catalytically converted into relatively high octane number fuel by the shape selective preference of said catalyst for admitting linear hydrocarbons during long operating cycles, and passing the resulting effluent into the intake manifold of a combustion engine for operation of the engine.

8. A method according to claim 7 wherein the fuel, after conversion in the hydrocarbon catalytic converter, is combined with air prior to introduction into the engine.

9. A method according to claim 8 wherein the hydrocarbon catalytic converter is operated at a temperature between about 900°–1000°F. and the catalyst is regenerated with air to prolong the life of the catalyst.

10. A method according to claim 9 wherein the catalytic converter is heated by indirect "heat exhange" with the exhaust gases from the engine.

11. A method according to claim 10 wherein the effluent from the catalytic converter is introduced directly into the intake manifold of an internal combustion engine in combination with air to obviate the requirement for a carburetor.

12. A method according to claim 8 wherein the hydrocarbon catalytic converter is operated at a temperature of at least 900°F. and the catalyst has an alpha value of at least 5,000.

13. In a method of operating an internal combustion engine which comprises contacting a liquid hydrocarbon fuel in the absence of air with a catalyst in a catalytic converter under hydrocarbon-cracking conditions and mixing the lower boiling hydrocarbons formed with air and passing said hydrocarbons into the fuel inlet of said internal combustion engine, the improvement comprising using a crystalline aluminosilicate catalyst of the ZSM–5 type, said aluminosilicate having a composition in terms of mole ratios of oxides as follows:

$$0.9 \pm 0.2\ M_{2/n}O:Al_2O_3:5-100\ SiO_2:zH_2O$$

wherein M is at least one cation having a valence $n$ selected from the group of alkylammonium, ammonium, hydrogen and mixtures thereof and $z$ is between 0 and 40, said aluminosilicate having the X-ray diffraction lines of Table 1 of the specification.

14. The process according to claim 13 wherein said hydrocarbon fuel is a hydrocarbon fraction boiling in the 100° to 700°F. range.

15. The process according to claim 13 wherein said fuel is an unleaded gasoline.

16. A method of operating an internal combustion engine which comprises:
  a. selecting a hydrocarbon fuel boiling in the range of 100°–700°F.,
  b. contacting said fuel with a catalyst in the absence of air in a catalytic converter heated to about 500° to 1,500°F. to convert a substantial portion of said fuel to gaseous hydrocarbons having about one to five carbon atoms in the molecule, said catalyst comprising a crystalline aluminosilicate catalyst of the ZSM–5 type, said aluminosilicate having a composition in terms of mole ratios of oxides as follows:

$$0.9 \pm 0.2\ M_{2/n}O:Al_2O_3:5-100\ SiO_2:zH_2O$$

wherein M is at least one cation having a valence $n$ selected from the group of alkylammonium, ammonium, hydrogen and mixtures thereof and $z$ is between 0 and 40, said aluminosilicate having the X-ray diffraction lines of Table 1 of the specification; and
  c. mixing said hydrocarbons with air and passing said mixture into the fuel intake system of said internal combustion engine.

17. The process according to claim 16 wherein the fuel is lead free.

18. The process according to claim 16 wherein the fuel is fed to said internal combustion engine through a carburetor.

* * * * *